United States Patent [19]

St. Clair

[11] 3,971,410

[45] July 27, 1976

[54] GAS PRESSURE REGULATOR HAVING LOW PRESSURE SHUT-OFF MEANS

[75] Inventor: Theodore A. St. Clair, Fairfield, Conn.

[73] Assignee: Textron, Inc., Providence, R.I.

[22] Filed: Mar. 5, 1975

[21] Appl. No.: 555,547

[52] U.S. Cl. .............................. 137/613; 137/116.5; 137/458; 137/505.46; 137/630.22
[51] Int. Cl.² ......................................... F16K 15/02
[58] Field of Search ........ 137/456, 464, 466, 116.5, 137/458, 461, 505.46, 613, 505.18, 630.22, 495; 417/437

[56] References Cited
UNITED STATES PATENTS

| 926,315 | 6/1909 | Beck | 417/437 |
|---|---|---|---|
| 963,528 | 7/1910 | Dickinson | 417/437 |
| 2,788,798 | 4/1957 | Mueller | 137/456 |
| 3,032,054 | 5/1962 | Irwin | 137/505.46 X |
| 3,098,499 | 7/1963 | Schwerter | 137/505.46 X |
| 3,386,465 | 6/1968 | Johnson | 137/505.46 X |
| 3,580,271 | 5/1971 | Farrer | 137/458 |
| 3,587,628 | 6/1971 | Farrer | 137/456 |
| 3,741,240 | 6/1973 | Berriman | 137/495 |
| T883,025 | 2/1971 | Hauggi | 137/495 |

Primary Examiner—Harold W. Weakley
Attorney, Agent, or Firm—Arthur A. Johnson

[57] ABSTRACT

There is disclosed herein a gas pressure regulator having valve means for stopping the flow of gas downstream through the regulator when the pressure of the incoming gas is lower than a predetermined acceptable value even though acceptable pressure is subsequently restored, and a unique method and means, generally not available for use by unauthorized persons, adapted to be manually operated for resetting the valve means after it is determined that the pressure of the gas flowing to the inlet of the regulator has returned to said predetermined acceptable value. Provision is made for monitoring the flow of gas through the regulator by an auxiliary valve and valve seat and stopping the flow of gas through the regulator in the event that the operation of the valve means is prevented from functioning properly by interference caused by a foreign substance between the pressure regulating orifice and the main valve seat, and also stopping the flow of gas through the regulator when the pressure of the gas is higher than said predetermined acceptable pressure. The novel method disclosed herein involves applying suction to the atmosphere side of the regulator diaphragm to reactivate a shut-off regulator.

9 Claims, 7 Drawing Figures

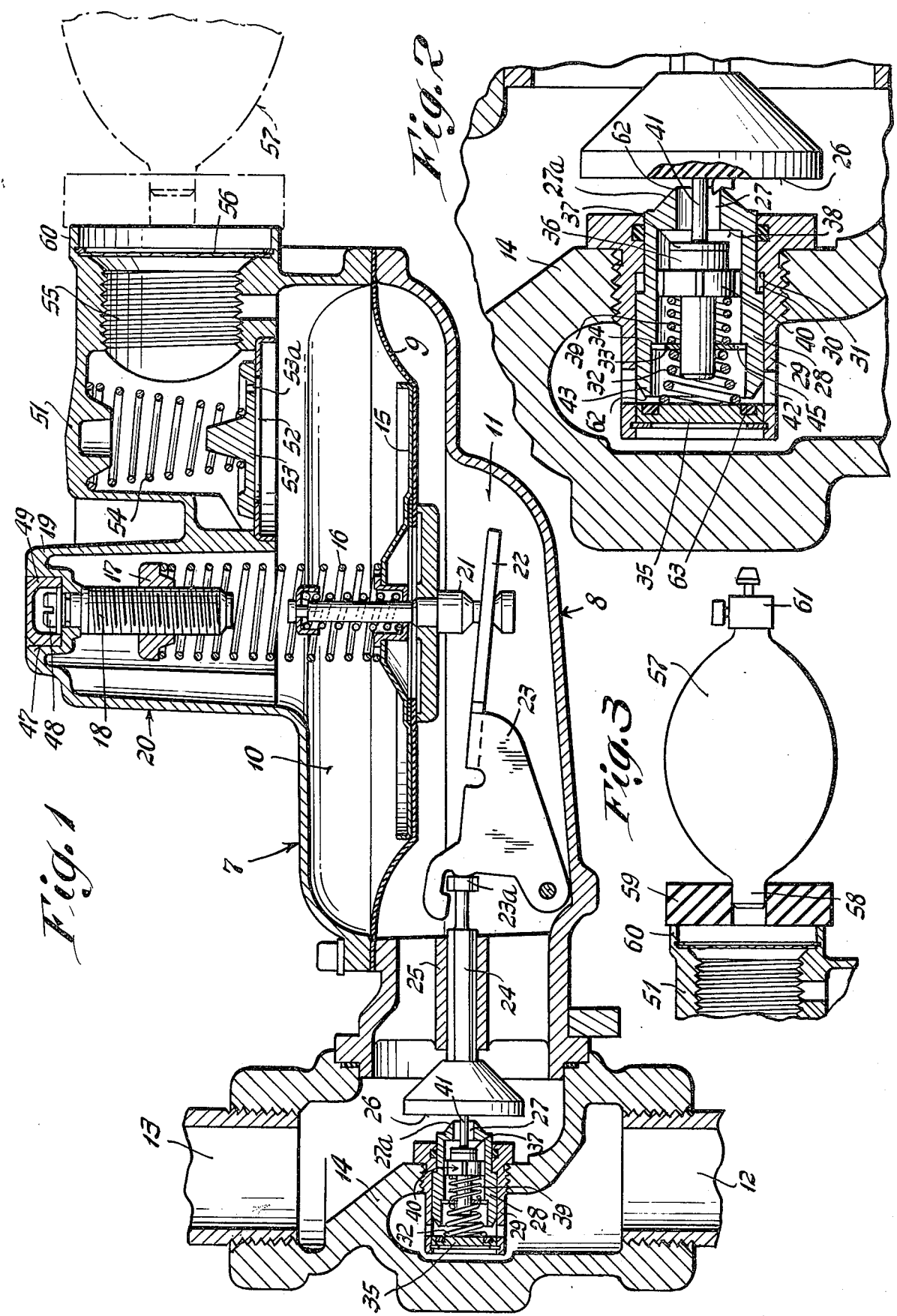

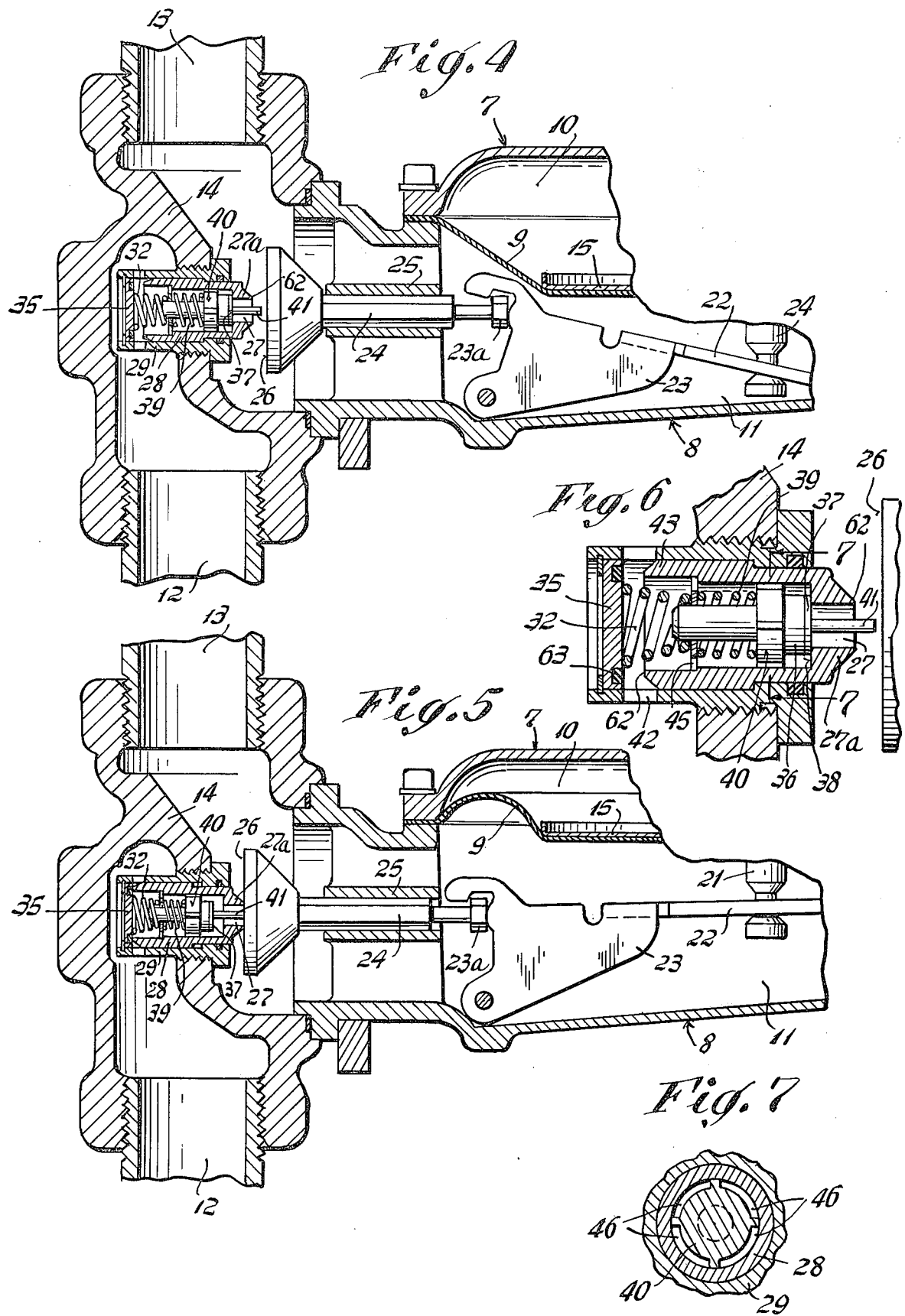

GAS PRESSURE REGULATOR HAVING LOW PRESSURE SHUT-OFF MEANS

This invention relates to safety means for gas pressure regulators such as service regulators which supply fuel gas to utility customers. In the functioning of such regulators, there are potential hazards (even though rare) resulting particularly from excessive underpressure conditions.

When an excessive underpressure condition exists, such as gas pressure failure, the pressure regulating valve of the regulator normally would be moved to wide open position and so remain until the pressure increases to an acceptable value. However, in the meantime, due to the excessive low pressure, any burners or pilot lights in use and not equipped with thermal safety shut-off valves, or in the case of malfunctioning thermal shut-off valves, gas will escape and accumulate in the atmosphere and create extremely hazardous explosive and asphyxiating conditions.

An object of this invention is to provide, in a service gas regulator, improved means for guarding against the hazardous conditions that result from excessively low pressure gas.

An important feature of this invention is the provision of safety valve means which completely shuts off the flow of gas from the inlet port of the regulator to the outlet port of the regulator when the pressure of the gas drops below a predetermined value and remains in shut-off condition, even after acceptable pressure conditions are restored, with the provision of means whereby the regulator may not be reactivated after it has been shut off because of excessive low pressure conditions except by a person possessed of a simple implement, not usually available, which is supplied to qualified servicemen who would be responsible to check all the burner and other gas outlets to determine that they all are closed before reactivating the regulator. Such an implement may be, as disclosed herein, a hand-operated suction pump to be applied to the outlet of the existing breather valve of the regulator which is in communication with the atmosphere side of the regulator, to suck the air therefrom and cause the diaphragm to rise and reset the low pressure responsive shut-off valve means.

Another feature is the provision of means in such a shut-off valve mechanism whereby the flow of gas to the regulator may be monitored and ultimately shut off, even if for any reason the main regulator valve fails to function, for instance when a foreign substance is interposed between the main valve and the orifice with which it cooperates.

Another important feature of this invention is the provision of a shut-off and regulating valve device which may be installed in the regulator housing as a self-contained unit thereby facilitating the installation, removal and replacement of the valve device.

Other features and advantages will hereinafter appear.

In the accompanying drawings:

FIG. 1 is a vertical sectional view showing a regulator in normal pressure monitoring condition and showing the shut-off and control valves of the present invention installed in the dividing wall interposed between the inlet and outlet ports of the regulator.

FIG. 2 is a sectional view on an enlarged scale of the valve mechanism of the present invention showing the position of the parts when a particle of foreign matter is lodged between the main valve seat and its orifice.

FIG. 3 shows in section a part of the vent for the diaphragm air chamber with the means supplied by the present invention for exhausting air from the said chamber to reset the safety valve.

FIG. 4 is a vertical section of a portion of the regulator showing the movable parts of the pressure control and shut-off valves in the positions they occupy under excessively low pressure conditions.

FIG. 5 is like FIG. 4, but shows the movable parts of the valves in the positions they occupy under excessively high pressure conditions.

FIG. 6 is a sectional view of the control and shut-off valves and associated parts of the present invention on an enlarged scale.

FIG. 7 is a sectional view of a portion of the control and shut-off valve taken on the line 7—7 of FIG. 6.

As shown in the accompanying drawings, the regulator to which the present invention is applied, as illustrative thereof, has an upper housing 7 and a lower housing 8. Between said housings there is a diaphragm 9 forming an air chamber 10 and a downstream gas chamber 11. The regulator has an inlet port 12 and an outlet port 13 separated by a wall 14. A plate 15 on the diaphragm 9 is engaged by a coil spring 16 which yieldably urges the diaphragm 9 to its lowermost position. The upper end of the spring 16 engages a nut 17 on a screw 18 mounted on the top 19 of a housing 20 to adjust the force exerted by the spring 16.

Operating means 21 secured to the diaphragm 9 engages the end portion 22 of a bellcrank 23 which engages one end 23a of a valve stem 24 slidably mounted in a bearing 25 in the lower housing 8 of the regulator. The other end of the stem 24 carries a main valve seat 26 which is moved by the bellcrank 23 closer to or farther from an orifice 27 when moved by the diaphragm 9 acted on by opposing forces, from gas pressure on the gas side of the diaphragm 9, and by the force of the spring 16 on the atmosphere side of the diaphragm respectively.

The regulator spring 16 is so adjusted as to counteract the force of the incoming gas on the gas side of the diaphragm 9 to cause the main valve 26 to move toward and away from the valve seat 27a of orifice 27 when the pressure of the incoming gas is within a predetermined range of acceptable pressures.

As in U.S. Pat. Nos. 3,613,725; 3,754,570 and 3,809,108 the orifice cooperating with valve seat 26 is a sliding orifice sleeve 28 which is slidably mounted in a bushing 29 secured in the dividing wall 14 between the inlet port 12 and outlet port 13 of the regulator. But as shown herein the orifice sleeve 28 has an external shoulder 30 positioned to engage a shoulder 31 on the bushing 29 under the force of a spring 32 interposed between a disk 33 engaging an internal shoulder 34 on the orifice sleeve 28 and an end closure 35 in the bushing 29. As will appear below, the sleeve orifice 28 may recede from its normal position shown in FIGS. 1 and 6 against the force of the spring 32.

In the normal operation of the regulator the main valve 26, under the influence of the diaphragm 9, advances toward and recedes from the valve seat 27a to allow less or more gas to pass between the inlet 12 and the outlet 13 of the regulator to compensate for normal variations in the pressure of the gas flowing through the system. However, there are rare, but ever possible, occasions when the pressure of the gas entering the regulator decreases beyond acceptable safe limits and produces potentially hazardous situations with possible serious results as pointed out above.

When for any cause the pressure of the gas in the regulator drops below a predetermined range of pressure, as in a conventional regulator, the diaphragm descends under the force of the regulator spring 16 and causes the main valve 26 to move away from the valve seat 27a and allow gas to freely flow into the diaphragm chamber 11 and through the outlet 13 to equipment being supplied with gas.

Normally under such low pressure conditions the flame of any operating burners or pilot lights would go out. If after this happens and the pressure comes back on the line, gas from any open burners or pilot lights not equipped with thermal shut-off valves (or in case any such valves are not functioning), will discharge into the atmosphere with the attendant danger of causing an explosion or possibly asphyxiating persons in the vicinity.

To avoid such hazards, the present invention provides in the orifice sleeve 28 a shut-off valve body 36 which has a safety valve 37 adapted to engage an upstream valve seat 38 of the orifice sleeve 28 under the influence of a spring 39 which extends between a guide block 40 forming part of the shut-off valve body 36 and the disk 33 which, as above stated, is engaged by the spring 32.

A pin 41, which may be mounted on the main valve seat 26, but, as shown, is affixed to the safety valve body 36, extends through and beyond the orifice 27, as shown in FIG. 1, in which the movable parts are shown in normal pressure-regulating positions with the pin 41 engaging the main valve seat 26 and the outer edge portion of the safety valve 37 spaced from the upstream valve seat 38 of the orifice sleeve 28. In this position the gas flows from the inlet 12 through passages 42 in the bushing 29, between the inner end 43 of the orifice sleeve 28 and the closure disk 35, through apertures 45 in the disk 33 and passages 46 (FIG. 7) in the guide block 40, between the safety valve 37 and upstream valve seat 38, through the orifice 27 of the orifice sleeve 28, between the latter and the main valve seat 26 into outlet 13 and impinging upon the gas in the diaphragm gas chamber 11.

In the normal operation of the regulator the safety shut-off valve body 36 reciprocates in the orifice sleeve 28 in response to the normal movement of the main valve seat 26 and does not control the amount of gas flowing through the regulator. However, if the pressure of the gas entering the regulator decreases below the lower limit of acceptable pressures, the main valve seat 26 will recede from the valve seat 27a allowing the pin 41 and safety valve body 36 under the force of the spring 39 to move the safety valve 37 against the upstream valve seat 38 of the orifice sleeve 28 and shut off the flow of gas through the orifice 27 to the outlet 13 of the regulator.

If safe gas pressure is restored in the inlet 12, the regulator will remain locked up because the gas flowing into the bushing 29 and orifice sleeve 28 would impinge upon the guide block 40 and hold the safety valve 37 firmly against the upstream valve seat 38 of the orifice sleeve 28.

Heretofore, with a regulator locked up by excessive low pressure shut-off means, access could be obtained (by unauthorized persons who may not have first examined the gas appliances to determine that they were shut off) to the interior of the regulator to restore the diaphragm to normal operating position. For instance, as shown in U.S. Pat. No. 2,351,047, by removing a cap covering the adjusting screw for the diaphragm spring and pulling on a rod connected to the diaphragm, the latter could be pulled up to reactivate the regulator. This could be accomplished by anyone having a cap wrench and might be done with disastrous results if the appliances were not shut off.

To avoid this problem the present invention provides means which is not readily available to the average person for reactivating a locked-up regulator and in the form of the invention herein disclosed the means for reactivating the regulator comprises a hand-operated suction pump 57 shown in FIG. 3 and partly shown in dot and dash lines in FIG. 1.

Service regulators usually have means for permitting the escape of gas to the atmosphere if, due to leakage, gas accumulates excessively in the upper or air chamber 10 of the regulator. Such means in the regulator shown in FIG. 1 comprises a lateral extension 51 having an opening 52 extending into the upper diaphragm chamber 10 which is normally held closed by a valve 53 acting under the influence of a spring 54 which is so tensioned that, if large quantities of gas should escape past the diaphragm 9 or its mounting means and builds up excessive pressure, the spring 54 will yield and allow the valve 51 to rise and the gas to escape to the atmosphere through a passage 55. In addition there is a small breather hole 53a in the valve 53 to permit air to flow into and out of the upper chamber 10 as the diaphragm is raised and lowered slightly in the operation of regulating the pressure of the gas in the regulator.

The suction pump 57 comprises a resilient bulb 57a and a neck 58 carrying a disk 59 of resilient material adapted to engage and make airtight connection with a flange 60 on the lateral extension 51 of the cover portion 7 of the regulator casing. The pump 57 has a one-way valve 61 which allows air to escape from the bulb when the latter is squeezed, but permits air to enter the bulb when it is permitted to expand upon the removal of the squeezing pressure so that air from the chamber 10 will be sucked into the bulb resulting in the diaphragm rising and causing the main valve to move the safety valve 37 off the upstream valve seat 38 and allow gas to enter the regulator and flow to the outlet 13.

With some regulators it is possible to reinstate them after a low pressure shut-off function by removing the adjustment cap and grasping an extension of the stem 21. Such is not possible with the present construction because the stem cannot be grasped through the opening for the adjustment screw 18.

However, to prevent someone from trying to reinstate the regulator as just discussed, and in doing so tampering with the regulator, adjustment cap 49 is so designed and positioned that it must be destroyed to get at the adjustment screw 18.

When for any cause the pressure of the gas on the underside of the diaphragm 9 rises beyond a predetermined limit to the position shown in FIG. 5, for instance, the bellcrank 23 will cause the valve seat 26 to move orifice 27 against spring 32 until chisel end 62 contacts valve seat 63 and stops the gas from flowing to the outlet of the regulator.

If some leakage exists between the orifice 27 and the main valve seat 26, the latter will continue to advance to the left, as viewed in FIGS. 1 and 5, until the end 62 on the orifice sleeve 28 engages an annular valve seat 63 on the end closure disk 35 on the bushing 29 and shuts off the flow of gas through the orifice sleeve.

This condition will continue until the pressure of the gas on the underside of the diaphragm drops sufficiently to allow the diaphragm to move down and withdraw the main valve 26 to the right, as shown in FIG. 1, to allow the spring 32 to push the orifice sleeve 28 to the right to the position shown in FIGS. 1 and 4 so that the chisel-edged end 62 of the sleeve 28 moves clear of the annular seat 63 and allows gas to flow into the lower chamber 11 and through the outlet port 13. When normal operating pressure is restored, the pin 45 will remain engaged with the main valve 26 as the diaphragm moves under slight variations of pressure in the regulator.

When a particle of foreign matter becomes lodged between the orifice 27 and the main valve seat 26, the regulator will continue to regulate the pressure of the gas by moving, through the medium of said foreign object, to increase or decrease the space between the chisel-edged end 62 and annular valve seat 63 on the closure disk 35 of the bushing 29.

Thus, the present invention has, as well as its other advantageous features, retained the features for providing for maintaining regulation of the gas pressures in spite of a foreign object being lodged on the orifice as disclosed in U.S. Pat. Nos. 3,742,972; 3,754,570; 3,809,108, especially No. 3,754,570 which shows an orifice sleeve with a chisel edge cooperating with a stationary seat to provide an automatic safety shut-off valve.

Variations and modifications may be made within the scope of the claims and portions of the improvements may be used without others.

I claim:

1. A gas pressure regulator comprising a housing having an inlet means, outlet means and a wall separating said inlet means and said outlet means; a diaphragm in the housing forming a gas chamber communicating with said outlet means and a chamber open to the atmosphere; an orifice sleeve extending between and communicating with said inlet means and said outlet means; means for mounting said orifice sleeve in said wall for axial sliding movement relative to said wall, said orifice sleeve having an orifice, an upstream valve seat and a downstream valve seat; a main valve; means operated by said diaphragm for moving said main valve toward and from said downstream valve seat of the orifice sleeve to regulate the flow of gas to said gas chamber and outlet means; and means including a safety valve slidably mounted in said orifice sleeve to engage said upstream valve seat to shut off the flow of gas through said orifice sleeve to said gas chamber and outlet means when the pressure of the gas in said gas chamber falls below a predetermined acceptable pressure.

2. The invention as defined in claim 1 in which there are means extending between said main valve and said safety valve for controlling the operation of the latter.

3. The invention as defined in claim 1 in which there is an auxiliary valve seat on the inner end of said orifice sleeve and means including a stationary auxiliary valve positioned to be engaged by said auxiliary valve seat to shut off the flow of gas to the orifice sleeve when the pressure of the gas in said gas chamber exceeds a predetermined acceptable high pressure value, and resilient means for normally urging said auxiliary valve seat away from said auxiliary valve.

4. The invention as defined in claim 1 in which said orifice sleeve is slidably mounted in a bushing which is supported in an aperture in said dividing wall.

5. The invention as defined in claim 1 in which said orifice sleeve is slidably mounted in a bushing which is supported in an aperture in said dividing wall and in which said bushing has an inner end closure and said auxiliary valve is supported on said closure.

6. The invention as defined in claim 5 in which said bushing has a lateral passage through which fuel gas may pass to said orifice sleeve when said auxiliary valve seat is disengaged from said auxiliary valve.

7. The invention as defined in claim 1 in which there are resilient means urging said safety valve into engagement with said upstream valve seat which comprises a spring interposed between said auxiliary valve and abutment means in said orifice sleeve.

8. The invention as defined in claim 7 in which a second resilient means comprises a spring interposed between said abutment means in said sleeve and said inner end closure of said bushing.

9. The invention as defined in claim 8 in which said bushing with said orifice sleeve, safety valve and both said resilient means comprises a unit insertable as such in an aperture in said dividing wall.

* * * * *